(12) United States Patent
Walter

(10) Patent No.: US 11,772,411 B2
(45) Date of Patent: Oct. 3, 2023

(54) STENCIL DEVICE FOR FORMING CONFIGURATIONS IN DEFORMABLE MATERIAL

(71) Applicant: Gregory Walter, Shorewood, IL (US)

(72) Inventor: Gregory Walter, Shorewood, IL (US)

( * ) Notice: Subject to any disclaimer, the term of this patent is extended or adjusted under 35 U.S.C. 154(b) by 571 days.

(21) Appl. No.: 17/106,592

(22) Filed: Nov. 30, 2020

(65) Prior Publication Data

US 2022/0169067 A1 Jun. 2, 2022

(51) Int. Cl.
| | |
|---|---|
| *B44B 5/00* | (2006.01) |
| *B44B 5/02* | (2006.01) |
| *E01C 9/00* | (2006.01) |
| *E01C 23/082* | (2006.01) |
| *A01C 1/04* | (2006.01) |
| *A01C 21/00* | (2006.01) |

(52) U.S. Cl.
CPC .............. *B44B 5/0085* (2013.01); *A01C 1/04* (2013.01); *B44B 5/0052* (2013.01); *B44B 5/0057* (2013.01); *B44B 5/026* (2013.01); *E01C 9/004* (2013.01); *E01C 23/082* (2013.01); *A01C 21/00* (2013.01)

(58) Field of Classification Search
None
See application file for complete search history.

(56) References Cited

U.S. PATENT DOCUMENTS

| | | | | |
|---|---|---|---|---|
| 2,567,843 A | * | 9/1951 | Gedminas ............... | E04F 13/02 425/470 |
| 3,254,417 A | * | 6/1966 | Carmichael, Sr. ...... | E04D 15/04 33/526 |
| 4,135,840 A | * | 1/1979 | Puccini ................... | E01C 19/43 404/93 |
| 4,527,337 A | * | 7/1985 | Dreiling .................. | G01B 5/02 D10/64 |
| 5,038,714 A | * | 8/1991 | Dye ........................ | B05B 12/20 118/301 |
| 5,215,402 A | * | 6/1993 | Stowell ................... | E01C 7/351 404/93 |
| 5,832,619 A | * | 11/1998 | Volkema, Jr. ........... | E04F 21/22 33/527 |
| 6,041,567 A | * | 3/2000 | Passeno ................... | E04G 9/10 52/749.11 |
| 6,951,435 B1 | * | 10/2005 | Fennessy, Sr. .......... | E01C 19/44 249/188 |
| 9,463,658 B2 | * | 10/2016 | Irwin ...................... | E04F 21/00 |
| 10,843,376 B2 | * | 11/2020 | Walter ................... | B28B 7/0064 |
| 2004/0149150 A1 | * | 8/2004 | Seifert .................... | B44B 5/02 101/3.1 |
| 2013/0177354 A1 | * | 7/2013 | Farrell ................... | E01C 19/43 404/93 |

* cited by examiner

*Primary Examiner* — Christopher W Fulton
(74) *Attorney, Agent, or Firm* — Donald G. Flaynik

(57) ABSTRACT

A stencil device for forming configurations in deformable material includes a first member having ridge portions integrally joined to channel portions that promote the insertion of the ridge portions of the first member into deformable material; and a second member having ridge portions integrally joined to protrusion portions that promote the insertion of the ridge portions of the second member into deformable material; whereby, the first and second members ultimately form a design pattern across a preselected surface of deformable material by alternating the insertion and removal of said first and second members across the preselected surface of the deformable material.

20 Claims, 14 Drawing Sheets

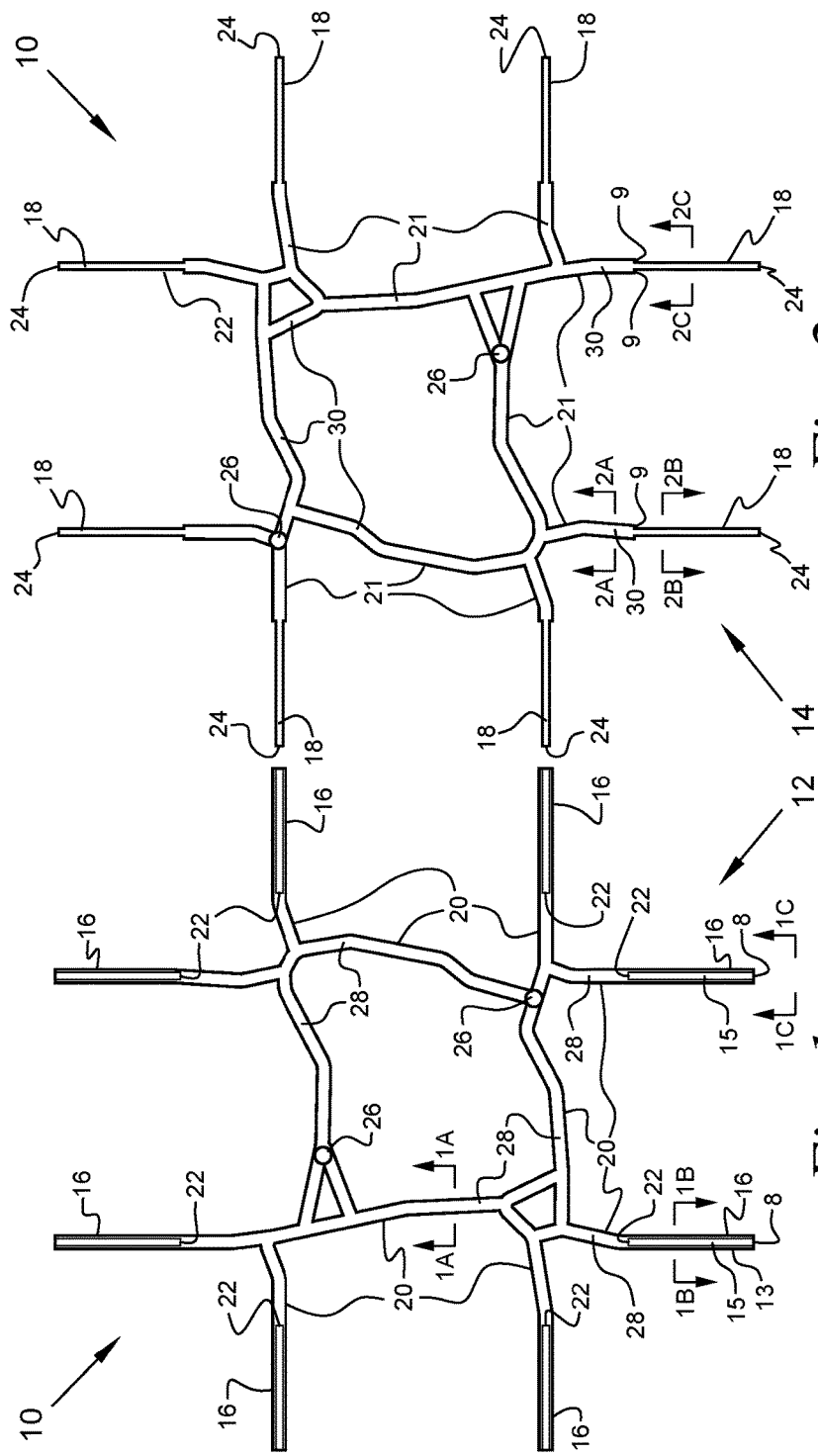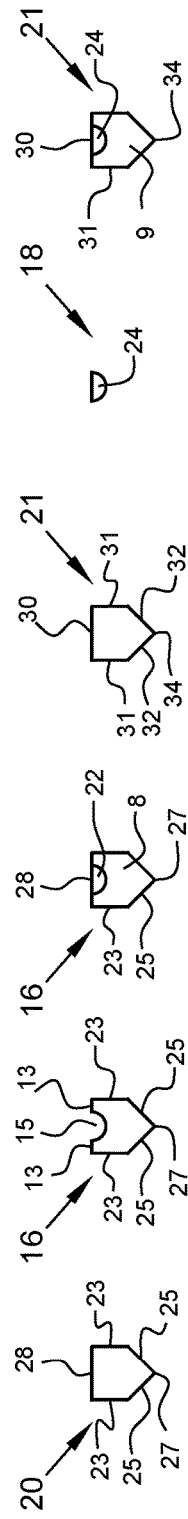

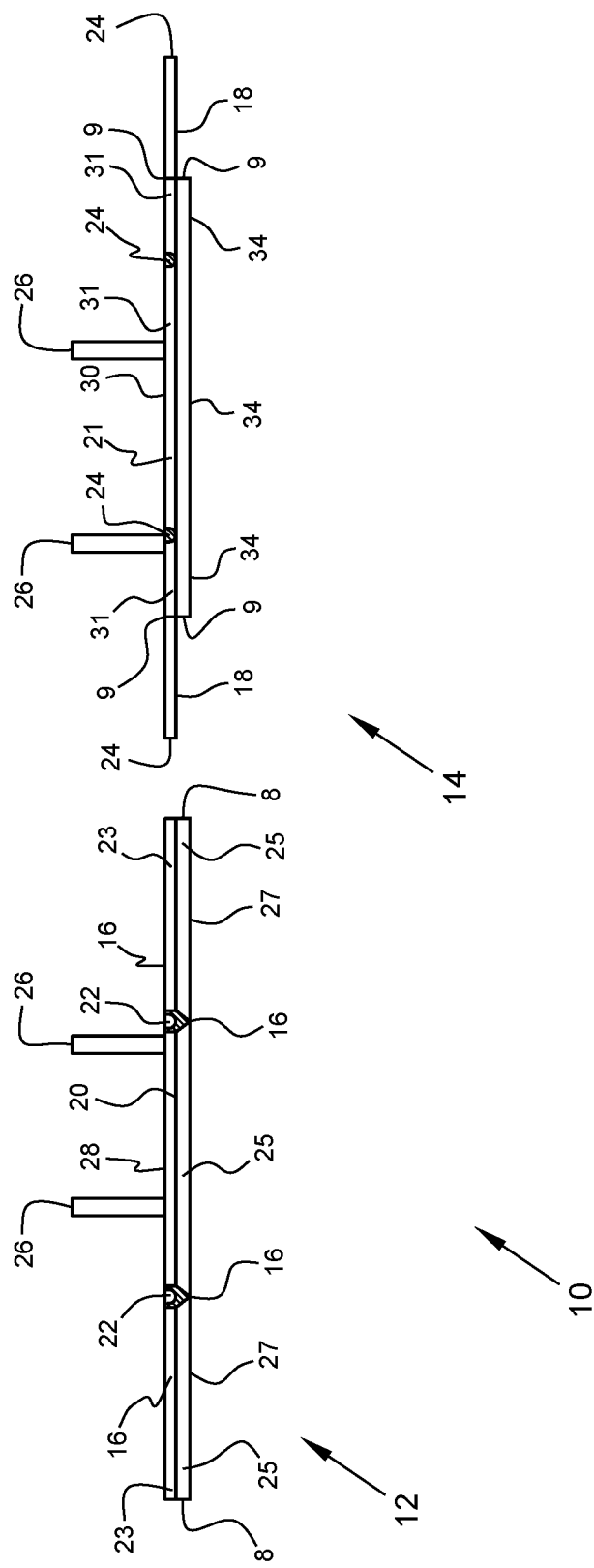

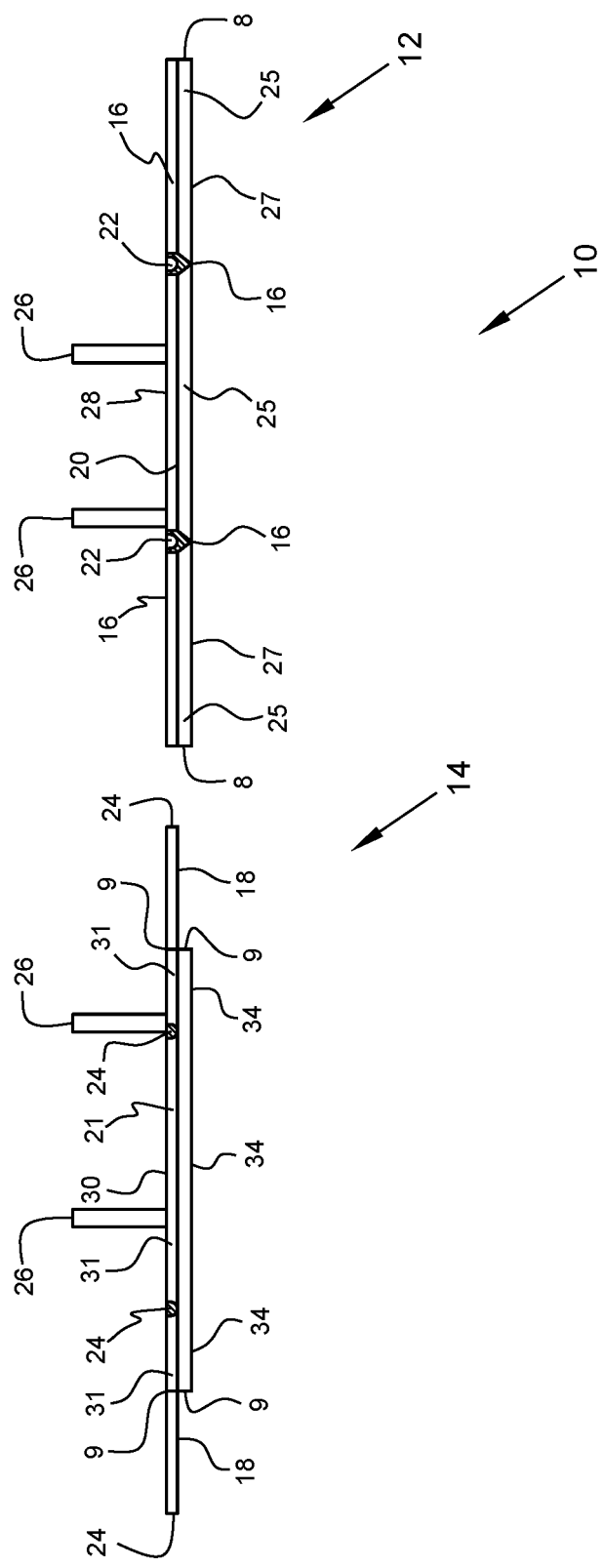

STENCIL DEVICE FOR FORMING CONFIGURATIONS IN DEFORMABLE MATERIAL

BACKGROUND OF THE INVENTION

1. Field of the Invention

The present invention relates to a device for impressing configurations into deformable material, and more particularly, to a stencil device having first and second members that are detachably joined together via respective channel and protrusion portions to form continuous recesses or configurations in deformable material when the first and second members are urged in the deformable material a predetermined distance.

2. Background of the Prior Art

Devices used for impressing configurations into deformable materials, specifically concrete, are well known and commonly used. A typical device for impressing configurations into the deformable concrete is manually operated such that a person urges a first stencil into the concrete to form a predetermined pattern. The person then selects a second stencil and disposes an edge portion of the second stencil adjacent to an edge portion of the first stencil while the first stencil is disposed in the concrete. The person then removes the first and second stencils from the concrete leaving recesses in the concrete that form the desired pattern or design in the concrete. The design becomes permanent after the concrete solidifies.

The problem with prior art stencils used to configure concrete is that when multiple stencils are required, the joining portions of the stencils leave imperfections or ridges in the concrete. There is a need for multiple stencils that impress recesses in concrete without forming ridges in the recesses.

SUMMARY OF THE INVENTION

It is an object of the present invention to overcome many of the disadvantages associated with prior art concrete configuration devices. A principal object of the present invention is to provide a stencil device having first and second members, whereby, when the first and second members are adjacently impressed in deformable concrete, after the first and second members are extracted from the deformable concrete, the resulting recesses are without ridges or other imperfections. A feature of the stencil device is first and second members detachably secured together via respective channel and protrusion portions. An advantage of the stencil device is that the channel portions detachably receive the protrusion portions, whereby, after the first and second members of the stencil device are urged into the deformable concrete, then extracted from the deformable concrete, no ridges or imperfections are formed in the resulting recesses.

Another object of the present stencil device is to provide first and second members that are adjacently disposed and detachably secured in deformable material, whereby, a user of the stencil device can maintain alignment and engagement between the first and second members when impressing a pattern in concrete. A feature of the stencil device is a first member having continuous ridge portions integrally joined to channel portions. Another feature of the stencil device is an insertion edge continuously joined to a bottom of the integrally joined ridge and channel portions of the first member. Still another feature of the stencil device is a second member having continuous ridge portions integrally joined to protrusion portions. Yet another feature of the stencil device is an insertion edge continuously joined to a bottom of only the ridge portions of the integrally joined ridge and protrusion portions of the second member. An advantage of the stencil device is that the insertion edge continuously joined to the bottom of the integrally joined ridge and channel portions of the first member cooperates with the insertion edge continuously joined to the bottom of only the ridge portion of the second member, whereby, a continuous insertion edge results from the first member detachably joined to the second member of the stencil device, thereby preventing ridges or other imperfections from forming in recesses impressed into the deformable material.

Still another object of the present stencil device is to provide first and second members having respective channel portions that receive protrusion members, whereby, ridges or other imperfections are prevented in recesses formed by the stencil device in the deformable material (concrete). A feature of the device is a first member having channel portions with end walls that engage cooperating end walls of protrusion portions of the second member. An advantage of the device is that insertion edges continue from the bottom of the integrally joined ridge and channel portions of the first member to the bottom of the ridge portions of the second member when the first and second members are detachably joined and impressed into concrete, resulting in continuous recesses (without imperfections) formed in the concrete after the detachably joined first and second members are extracted from the deformable concrete.

BRIEF DESCRIPTION OF THE DRAWINGS

The foregoing invention and its advantages may be readily appreciated from the following detailed description of the preferred embodiment, when read in conjunction with the accompanying drawings in which:

FIG. 1 is a top plan view of a first stencil member for forming configurations in deformable material in accordance with the present invention.

FIG. 1A is a sectional view taken along line 1A-1A in FIG. 1.

FIG. 1B is a sectional view taken along line 1B-1B in FIG. 1.

FIG. 1C is an end view of channel portion depicted in FIG. 1.

FIG. 2 is a top plan view of a second stencil member for forming configurations in deformable material in accordance with the present invention.

FIG. 2A is a sectional view taken along line 2A-2A in FIG. 2.

FIG. 2B is a sectional view taken along line 2B-2B in FIG. 2.

FIG. 2C is a sectional view taken along line 2B-2B in FIG. 2.

FIG. 5 is a front elevation view of the first stencil member of FIG. 1.

FIG. 6 is a front elevation view of the second stencil member of FIG. 2.

FIG. 7 is a rear elevation view of the first stencil member of FIG. 1.

FIG. 8 is a rear elevation view of the second stencil member of FIG. 2.

DESCRIPTION OF THE PREFERRED EMBODIMENT

Figures 3, 4:
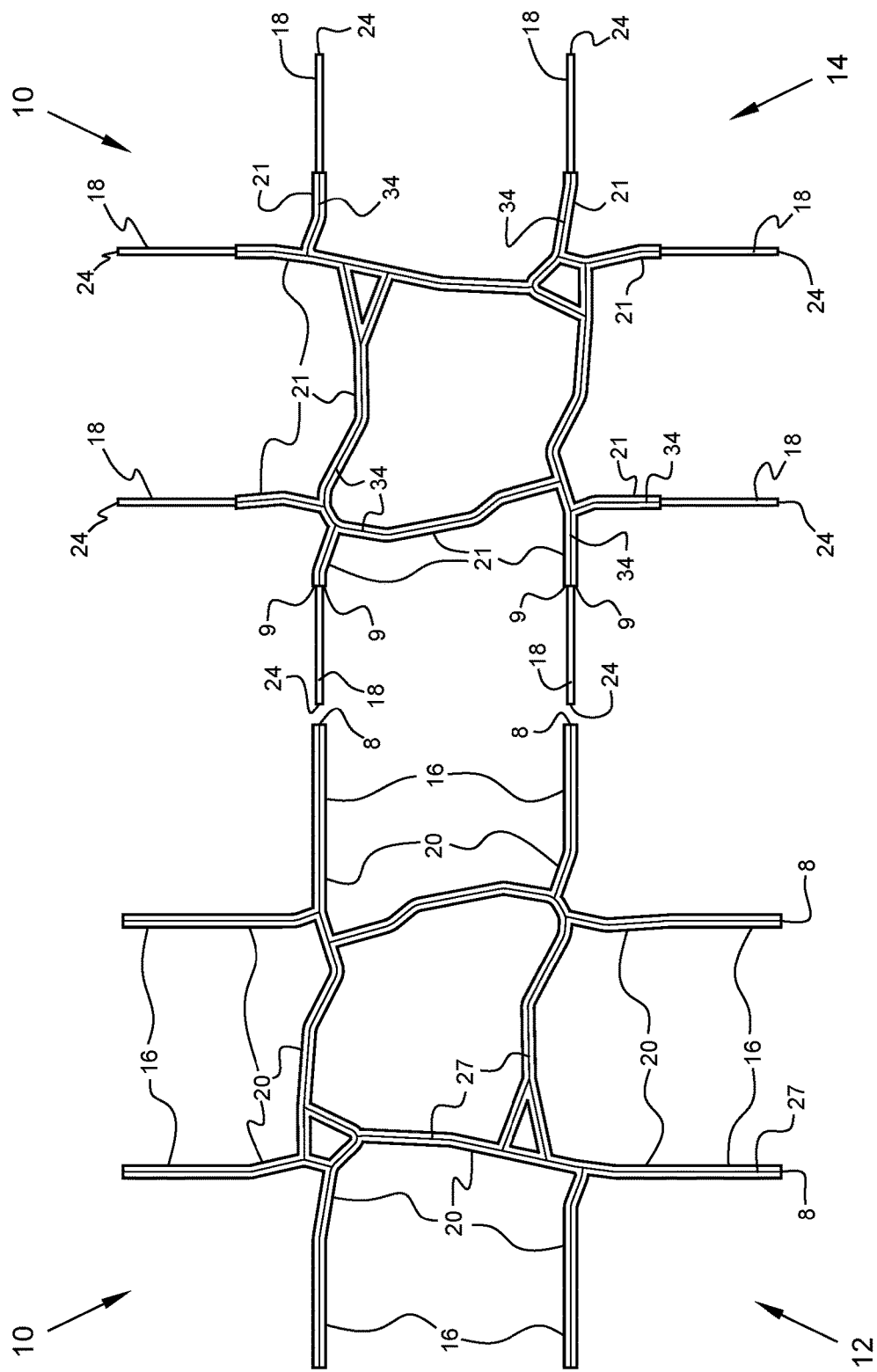
FIG. 3 is a bottom plan view of the first stencil member of FIG. 1.
FIG. 4 is a bottom plan view of the second stencil member of FIG. 2.

Referring to FIGS. 1-11, a stencil device for forming configurations in deformable material (preferably concrete or mortar) that ultimately solidifies in accordance with the present invention is denoted as numeral 10. The stencil device 10 includes at least one and preferably two separate first and second stencil members 12 and 14 that are manufactured from rigid material, including but not limited to, steel, polyurethane or similar polymers; or can be manufactured from paper, paper with soil and seeds, wood and hard rubber. The stencil device 10 can include a myriad of designs to simulate shapes including but not limited to flagstone, bricks, tiles and slate. The stencil device 10 can be permanent, removable or dissolvable and include coloring agents and/or a foam skin.

The first and second stencil members 12 and 14 are manufactured from rigid material and include insertion dimensions measured from respective top walls 28 and 30 to insertion edges 27 and 34, the insertion dimensions ranging from about one-eighth of an inch to a dimension sufficient to penetrate deformable material 19 from a surface portion to a base material upon which deformable material 19 has been disposed. The stencil members 12 and 14 ultimately form recesses 17 in the deformable material 19 (see FIG. 10) that allow a coloring agent such as dye or iron oxide in suspension to be distributed in and to permanently mark the recesses 17, thereby representing the coloring agent as grout lines. The lateral dimensions of the formed recesses 17 correspond to the lateral dimension of the top walls 28 and 30, the lateral dimensions ranging from about one-quarter inch to a lateral dimension corresponding to the selected configuration to be formed in the deformable material 19.

Alternatively, the first and second members 12 and 14 can be fabricated from a relatively rigid dissolvable paper having a coloring agent imparted into the deformable material. The relatively rigid dissolvable paper includes an insertion dimensions that penetrate the deformable material 19 a predetermined distance. The dissolvable paper ultimately dissolves in the deformable material 19 before it solidifies; whereby, the coloring agent leaches in the relatively firm deformable material 19, thereby forming a permanent colored design in the deformable material 19 after the deformable material 19 has solidified.

The first and second separated members 12 and 14 of the stencil device 10 are detachably joined together (FIGS. 9-10) via respective channel and protrusion portions 16 and 18 to ultimately form continuous recesses 17 or configurations in deformable material 19 when the first and second members 12 and 14 are urged into the deformable material 19 a predetermined distance. The first and second members 12 and 14 are removed from the deformable material 19 after the deformable material 19 has sufficiently solidified, whereby a predetermined continuous recess 17 is formed in the deformable material 19. In the event that the dimensions of the first and second members 12 and 14 are insufficient to cover selected surface areas of the deformable material 19, a second first member 12 is detachably joined to the second member 14. Alternatively, another second member 14 can be detachably joined to the first member 12. Additional first and second members 12 and 14 would be used to extend the continuous recess 17 upon the selected surface areas of the deformable material 19 until a configuration or design covers all selected surface areas of the deformable material 19.

The channel portions 16 of the first member 12 include planar top walls 13 having a longitudinal semi-annular recess 15 (see FIG. 1B) for snugly receiving a cooperating protrusion portion 18 of the second member 14. The channel portions 16 further include first end walls 8, upper planar side walls 23 and lower substantially "V" configured portions 25 forming insertion edges 27 that promote the insertion of the channel portions 16 into the deformable material 19.

The first member 12 further includes ridge portions 20 integrally joined to the channel portions 16 whereby second end walls 22 are formed. The ridge portions 20 include planar top walls 28 (see FIG. 1A), upper planar side walls 23 and lower substantially "V" configured portions 25 that form insertion edges 27 that promote the insertion of the ridge portions 20 into the deformable material 19. At least one and preferably two grasping handles 26 are integrally joined to the top walls 28 of the ridge portions 20 to enable a user to manually grasp the handles 26 and forcibly urge the first member 12 into the deformable material 19 after the deformable material 19 has sufficiently solidified. The handles 26 promote the manual removal of the first member 12 from the deformable material 19 after the deformable material 19 has further solidified to a degree that satisfies the user.

The second member 14 includes ridge portions 21 integrally joined to the protrusion portions 18 whereby first end walls 9 (see FIG. 2A) are formed. The ridge portions 21 include second end walls 24, planar top walls 30 (see FIG. 2A), upper planar side walls 31 and lower "V" configured portions 32 forming an insertion edge 34 that promotes the insertion of the ridge portions 21 into the deformable material 19. Irrespective of the first or second members 12 and 14 being disposed first upon the deformable material, the first end walls 8 of the channel portion 16 of the first member 12 ultimately engage corresponding first end walls 9 of the protrusion portion 18 of the second member 14, thereby providing continuous ridges 20 and 21 extending from the first member 12 to the second member 14, resulting in continuous recesses 17 without undulations, ridges or "spikes" being formed in the recesses 17 in the deformable material 19 after the first and second members 12 and 14 are extracted from the deformable material 19.

To enable the first end walls 8 of the channel portions 16 to congruently engage the first walls 9 of the protrusion portions 18, the longitudinal dimension between the first and second end walls 8 and 22 of the channel portions 16 is slightly greater than the longitudinal dimension between the first and second end walls 9 and 24 of the protrusion portions 18, resulting in a relatively slight gap between the second end walls 22 of the channel portions 16 and the second end walls 24 of the protrusion portions 18.

Figure 9:
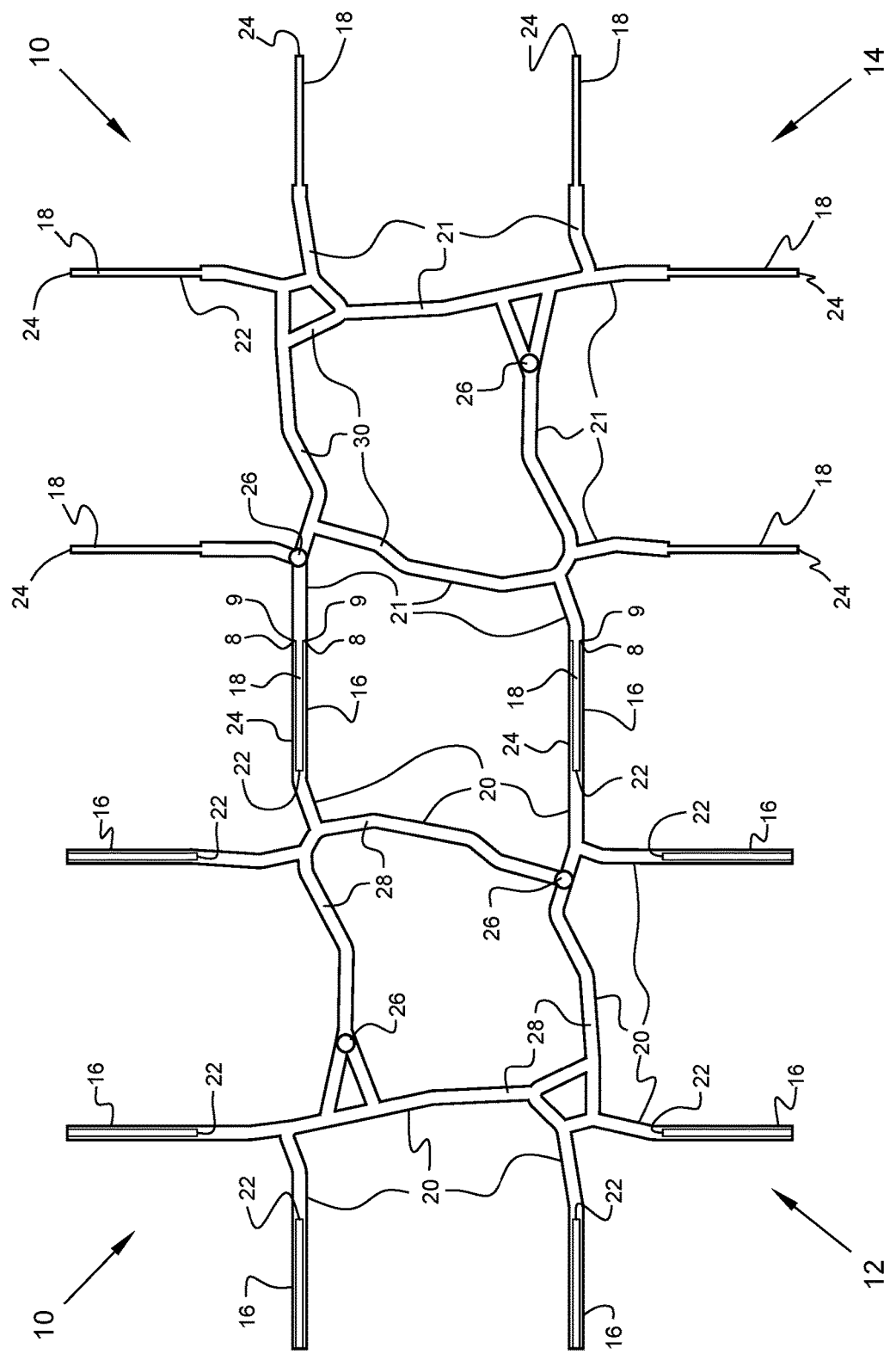
FIG. 9 is a top plan view of the first and second stencil members of FIGS. 1 and 2 detachable joined together in accordance with the present invention.
Figure 10:
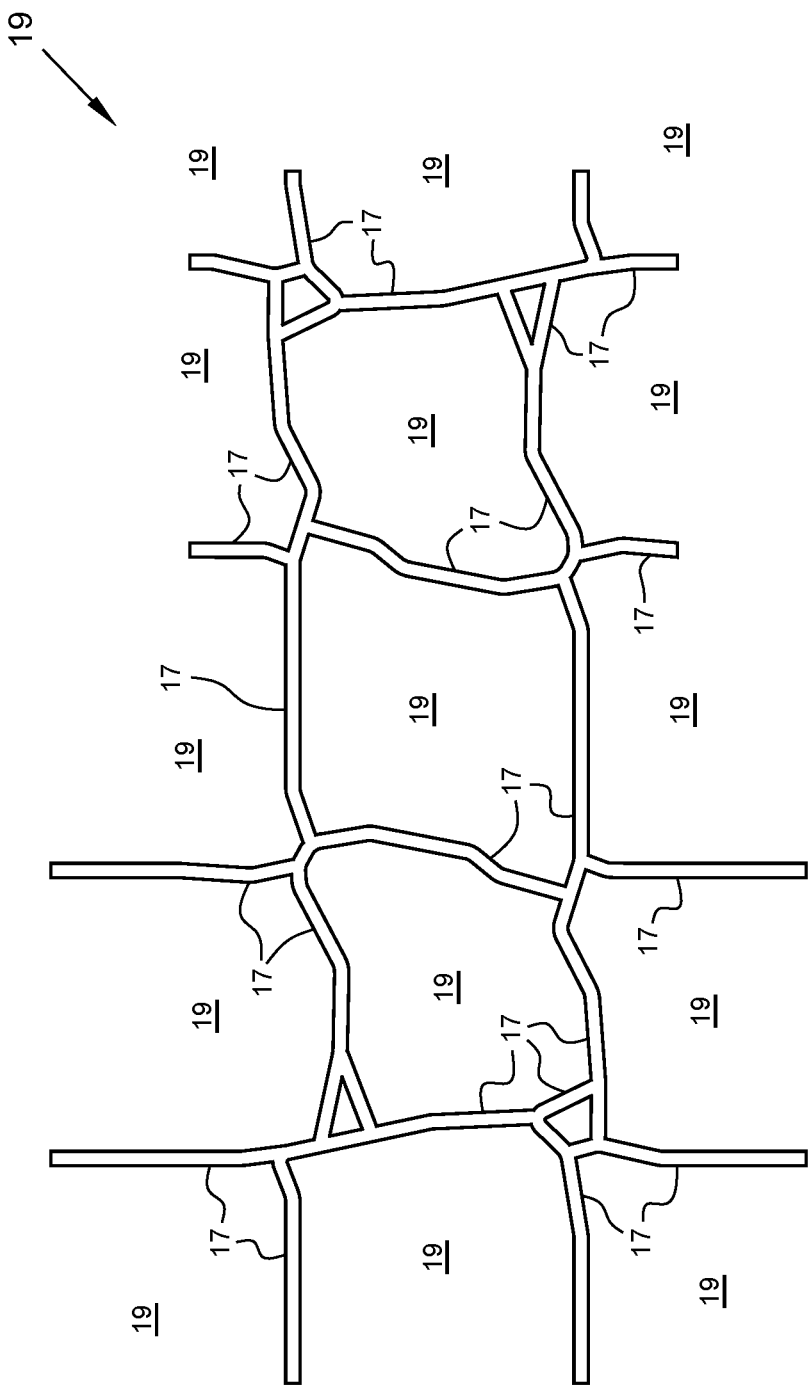
FIG. 10 is a top plan view of recesses formed in deformable material after the joined first and second stencil members of FIGS. 1 and 2 have been removed from the deformable material in accordance with the present invention.
Figure 11:
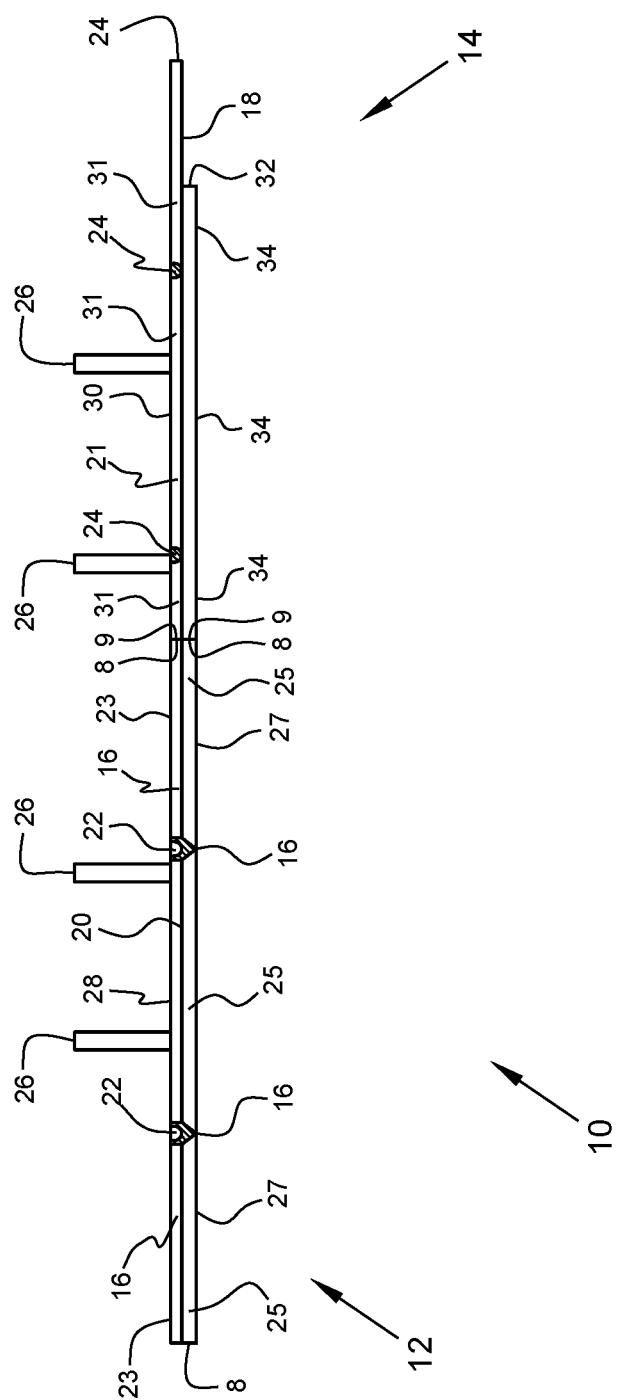
FIG. 11 is a front elevation view of the joined first and second members depicted in FIG. 9.

The insertion of the protrusion portions 18 into the channel portions 16 results in first walls 8 of the channel portion 16 engaging first walls 9 of the protrusion portions 18 (see FIG. 9). The channels 16 provide guides for axially aligning the protrusion portions 18 with the channel portions 16 after the first member 12 is inserted into the deformable material 19 and the second member 14 is detachable secured to the first member 12 as the second member 14 is urged into the deformable material 19, whereby, respective insertion edges 27 and 34 form a continuous recess 17 in the deformable material 19 (see FIG. 10). In the event that either the first or second members 12 and 14 are inserted into the deformable material 19 a depth that results in protrusion portions 18 not inserted into channel portions 16 forming recesses in a surface portion of the deformable material 19, the first member 12 will ultimately be positioned, whereby, respective channel portions 16 will be disposed upon the protrusion portion 18 formed recesses, thereby forming channel portion formed recesses 17 that replace protrusion portion 18 formed recesses.

At least one and preferably two grasping handles 26 are integrally joined to a top surface 30 of the ridge portion 21 to enable the user to manually grasp the handles 26 and forcibly urge the second member 14 into the deformable material 19 after the deformable material has become sufficiently solidified. After a predetermined time has elapsed, the user forcibly elevates the second member 14 from the deformable material 19 followed by the first member 12 after impressing a continuous recess 17 into the relatively rigid deformable material 19.

The configurations of the first and second members 12 and 14 are different and irregular, however, a first constant feature of the stencil device 10 is that there are two channel portions 16 on each side of the first member 12 and two protrusion portions 18 on each side of the second member 14. A second constant feature of the device 10 is that the distance separating each of the two channel portions 16 on any side of the first member 12 and the distance separating each of the two protrusion portions 18 on any side of the second member 14 are all the same measurement. The first and second members 12 and 14 include substantially a square configuration with each side of each member 12 and 14 having a preferred dimension ranging between two and three feet, however, the side dimension can be greater than or less than the preferred dimension. The first and second constant features allow any side of the first member 12 to be detachably joined to any side of the second member 14, thereby allowing the user to impress a myriad of recesses 17 into the deformable material 19 by varying the detachably joined sides of any two first and second members 12 and 14.

For example, a user can start with four stencil members with two of the stencil members 12 having only channel portions 16, and the remaining two stencil members 14 having only protrusion portions 18. Further, each of the four members 12 and 14 can have a different configuration. After selecting a first side of one of two first stencils 12 with channel portions 16, any one of the four sides of one of two second stencils 14 with protrusion portions 18 can be detachably joined with the selected first side channel portions 16. Alternatively, any one of the four sides of the second of the two stencils 14 with protrusion portions 18 (a total of eight sides with protrusion portions 18) can be detachably joined to the selected first side of the first stencil 12 with channel portions 16. The imagination of the user is the only limitation to the number of recess 17 configurations that can be impressed into the deformable material 19. The only requirement for the user to achieve a selected configuration is that the channel portions 16 of a first member 12 must axially align with the protrusion portions 18 of the second member 14 before detachably joining the first and second members 12 and 14.

The user can increase his or her options when configurating recesses 17 in a deformable material 19 by integrally joining two channel portions 16 to first and third sides of a first member 12, and integrally joining two protrusion portions 18 to second and fourth sides of a first member 12. The same variations can be included on a second member 14 or multiple members of the stencil device 10. Further, the stencil members 12 and 14 can include configurations having more than four sides, for example, hexagonal configurations. Further, the insertion depth of the first stencil member 12 and can vary from the insertion depth of the second stencil member 14; and the material of fabrication for the first stencil member 12 can vary from the material of fabrication for the second stencil member 14, thereby providing a myriad of designs and materials providing the designs, including but not limited to grout, polymers, dyes and soil and seed to grow living plants in recesses 17 penetrating the deformable material 19 to the material (generally stones) upon which the deformable material has been disposed.

To decrease the time required to impress recesses 17 into a deformable material 19, a rolled stencil device 10 having a predetermined configuration and length and width sufficient to cover the entire surface area of the deformable material 19 can be used. The rolled stencil device 10 is fabricated from a relatively light weight flexible polymer material to promote the manual lifting and rolling and unrolling of the stencil device 10 upon the deformable material 10. In the event that the surface area of the deformable material 19 is too large for one rolled stencil device 10, multiple rolled stencil members 12 and 14 having the same configurations, channel portions 16 and protrusion portions 18 depicted in FIGS. 1 and 2 are used. Each rolled stencil member 12 and 14 includes a lateral dimension (preferably between two and three feet) equal to one side of either stencil member 12 and 14 depicted in FIGS. 1 and 2. Each rolled stencil member 12 and 14 includes a longitudinal dimension equal to the length of the corresponding surface of the deformable material 19 to be configured via detachable joined first and second rolled stencil members 12 and 14.

The first rolled member 12 includes a longitudinal dimension equal to at least one side dimension of a preselected surface area of deformable material 19. The first rolled member 12 further includes the same ridge portions 20 integrally joined to channel portions 16, top walls 28, upper planar side walls 23 and lower portions 25 having bottom insertion edges 27 that promote the insertion of the ridge portions 20 of the first rolled member 12 into deformable material 19 as describe above.

The second rolled member 14 includes a longitudinal dimension equal to at least one side dimension of a preselected surface area of deformable material 19. The second rolled member 14 further includes the same ridge portions 21 integrally joined to protrusion portions 18, top walls 30, upper planar side walls 31 and lower portions 32 having bottom insertion edges 34 that promote the insertion of the ridge portions 21 of the second rolled member 14 into deformable material 19 as describe above. The protrusion portions 18 are ultimately disposed in the channel portions 16 of the first rolled member 12, whereby, end walls 24 of the protrusion portions 18 engage cooperating end walls 22 of the channel portions 16 for preventing undulating recesses 17 from being formed in the deformable material 19.

A common distance separating adjacent channel portions 16 on each longitudinal side (not depicted) of a first rolled member 12 is equal to a common distance separating adjacent protrusion portions 18 on each longitudinal side (not depicted) of the second rolled member 14. The first and second members 12 and 14 are detachably joined via the channel portions 16 detachably receiving cooperating protrusion portions 18; whereby, a longitudinal side of the first rolled member 12 can be detachably joined to a longitudinal side of the second rolled member 14, thereby allowing either longitudinal side of the first rolled member 12 to be detachably joined to either longitudinal side of the second rolled member 14; whereby, multiple recess configurations 17 are formed in the deformable material 19 by varying the insertion and removal of the first and second rolled members 12 and 14 in a preselected surface of the deformable material.

In operation, a first rolled member 12 is unrolled and disposed upon a selected surface area of the deformable material 19 after the material has sufficiently solidified, and a second rolled member 14 is unrolled upon the deformable material 19 whereby protrusion portions 18 of the second member 14 are detachably joined to corresponding channel portions 16 of the first member 12. After disposing the rolls of members 12 and 14 upon the surface of the deformable material 19, each member 12 and 14 is forcibly urged into the partially solidified deformable material 19 via means well known to those of ordinary skill in the art. When the user decides that a sufficient time has passed for the deformable material 19 to further solidify, the protrusion portions 18 of the second member 14 are separated from the channel portions 16 of the first member 12 by slowly re-rolling the second member 14. The first member 12 is then re-rolled and the deformable material 19 is allowed to solidify, resulting in the recess 17 configuration being permanently displayed on the surface of the deformable material 19.

Figure 12:
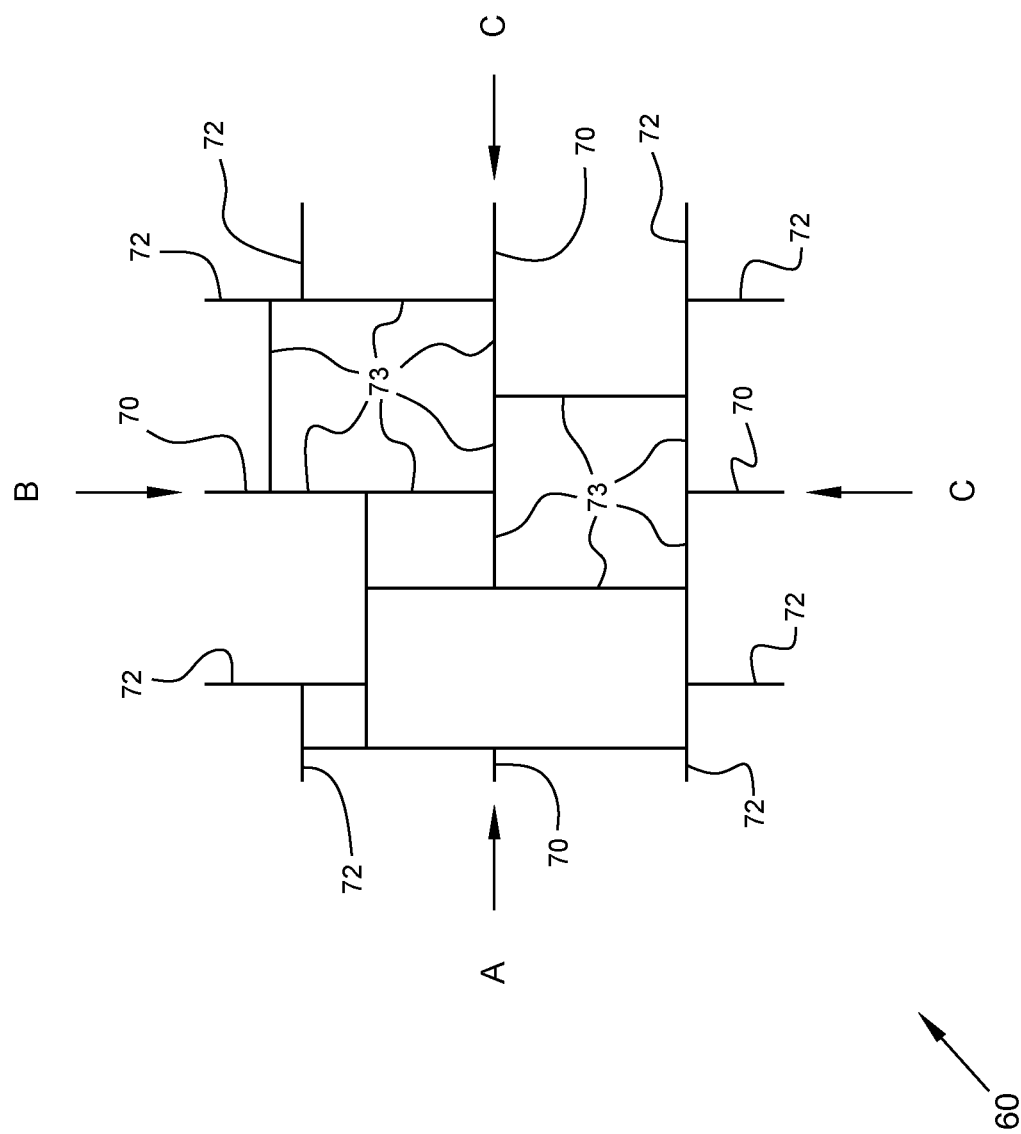
FIG. 12 is a top plan view of a first alternative stencil device for configuring deformable material, the first alternative device having a stonework pattern of blocks in accordance with the present invention.
Figure 12A:
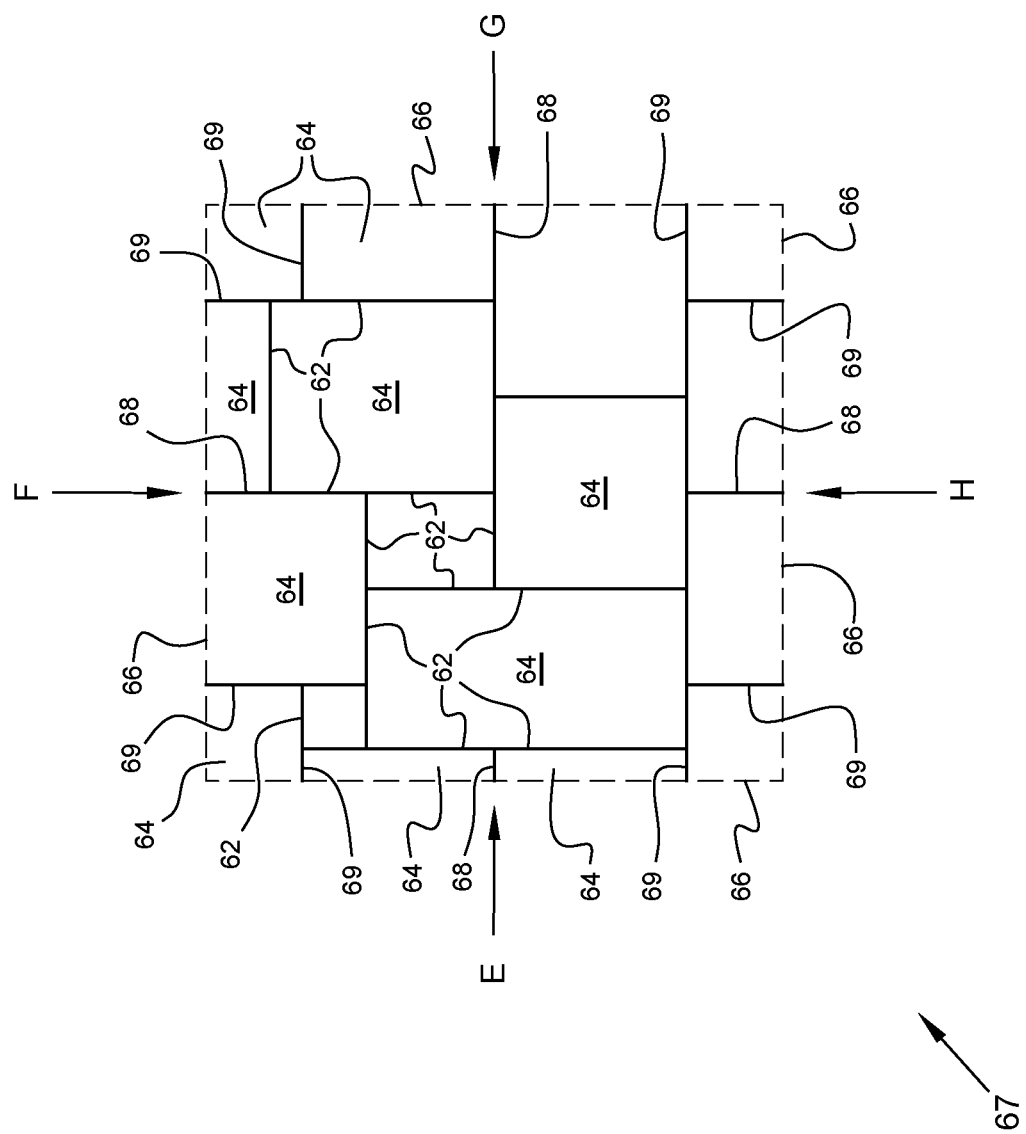
FIG. 12A is a top plan view of the recesses formed in in a section of deformable material after the stencil device depicted in FIG. 12 has been extracted from the deformable material in accordance with the present invention.

Referring to FIGS. 12 and 12A, a first alternative stencil device for configuring deformable material that solidifies in accordance with the present invention is depicted and denoted as numeral 60. The stencil device 60 includes a stonework pattern that ultimately forms blocks 64 (FIG. 12A) resembling unit pavers in a section 67 of deformable material 66. The device 60 is formed from multiple sections 73 of metal or similar rigid material having a thickness or edge portion of about one-eighth inch, a lateral dimension (the penetration depth of the sections 73) ranging from about one-quarter inch to a dimension sufficient to penetrate the deformable material 66 to a depth that engages the material upon which the deformable material has been disposed. The multiple sections 73 further include longitudinal dimensions that vary relative to the configuration of the stencil device 60 formed by joined portions of the multiple sections 73.

In operation, the first alternative stencil device 60 penetrates the surface of the deformable material 66 after the material 66 has sufficiently solidified; whereupon, the device 60 is extracted from the deformable material 66, thereby forming recesses 62 in the material 66 that ultimately represent grout lines 62 (FIG. 12A) that separate adjacent blocks 64. The recesses 62 ultimately receive a coloring agent such as dye or iron oxide in suspension that is disposed upon the recesses 62 in the deformable material 66, thereby, permanently marking the dividing lines between the adjacent blocks 64 to appear as grout lines 62 between adjacent blocks 64.

The extracted stencil device 60 is re-inserted into the deformable material 66 adjacent to the section 67 of deformable material 66; whereby, the stonework pattern is continued by axially aligning a centerline 70 and two guidelines 72 (each guideline 72 is equally spaced on opposite sides from and parallel to the centerline 70) of a selected side (A-D) of the first alternative stencil device 60 (FIG. 12) above respective recesses 68 and 69 previously formed in a selected side (E-H) of the deformable material 66 (FIG. 12A). After completing the axial alignment, the device 60 is urged into the deformable material 66 a predetermined distance; whereby, the end portions of lines 70 and 72 of a selected side (A) of the device 60 engage end portions of respective aligned recesses 68 and 69 of a selected side (G) of the of the deformable material 66 section 67. After the stencil device 60 is extracted from the deformable material 66, continuous lineal recesses 68 and 69 extend from side (G) of section 67 of the deformable material 66 into side (E) of section 67A of deformable material 66 (see FIG. 12B).

Figure 12B:
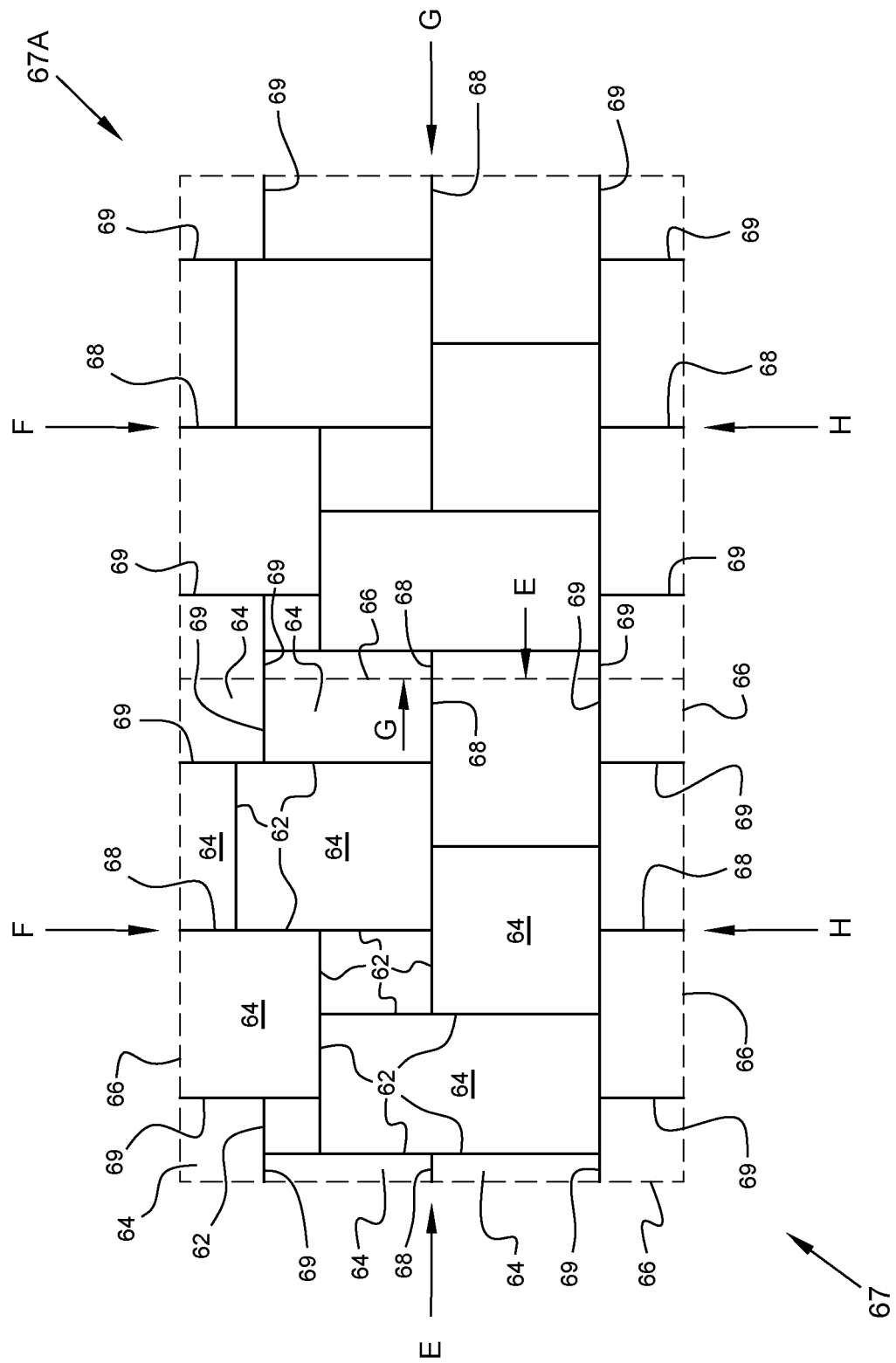
FIG. 12B is a top plan view of two sets of continuous joined recesses formed in two sections of deformable material by the first alternative stencil device depicted in FIG. 12 that formed the set recesses depicted in FIG. 12A.
Figure 12C:
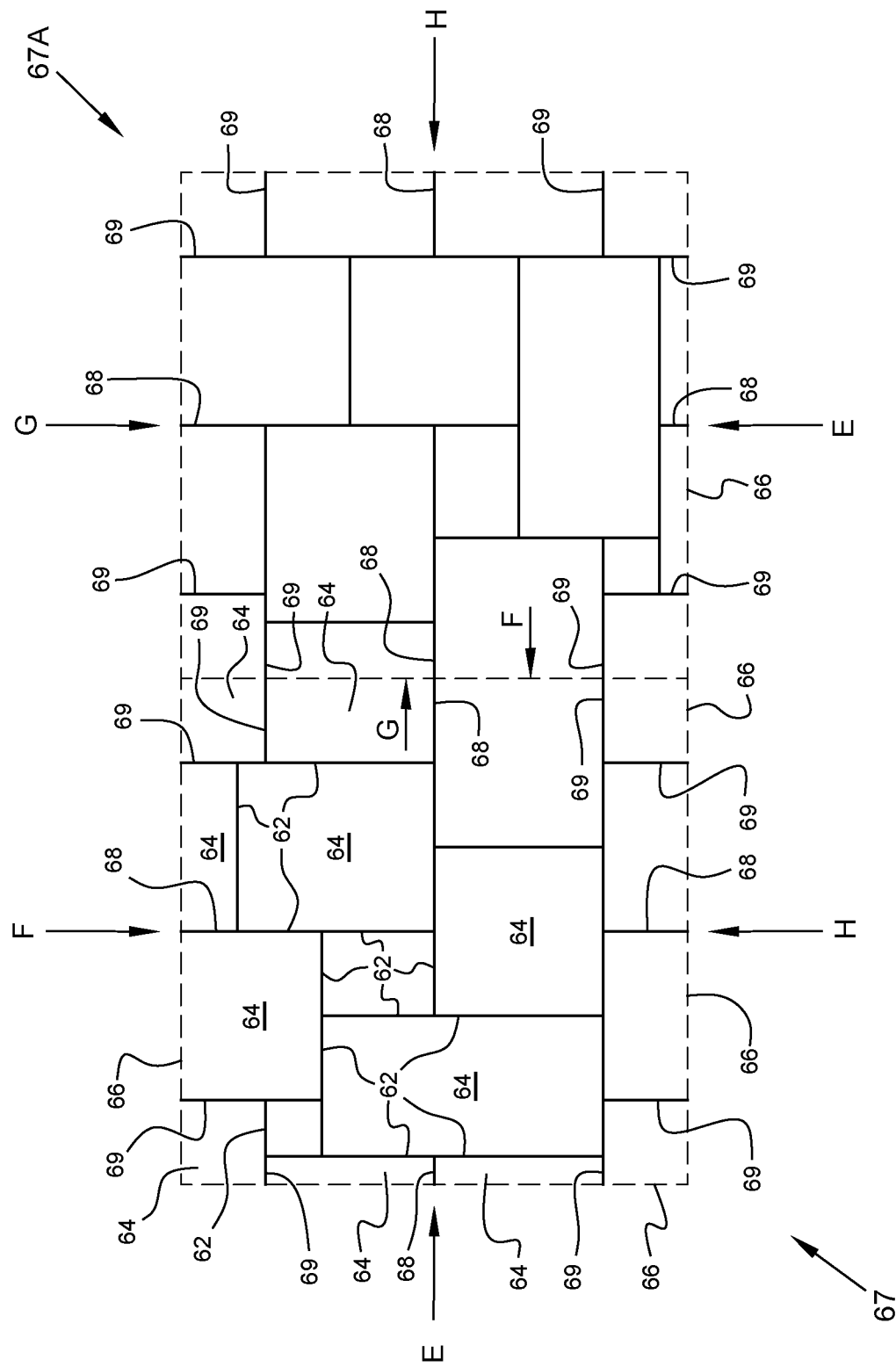
FIG. 12C is the top plan view of FIG. 12B, but with a recess pattern formed in section 67A, resulting from the first alternative stencil device depicted in FIG. 12 rotated ninety degrees.

The stonework pattern is then repeated via inserting the extracted stencil device 60 into an adjacent surface of deformable material 66 until the stonework pattern covers the entire surface of the deformable material 66 with a coloring agent applied to all the recesses 62, 68 and 69. Although the stonework pattern is depicted in FIGS. 12, 12A and 12B, any configuration for the first alternative stencil device 60 can be used to impress any selected design into the deformable material 66. Further, the stonework pattern depicted in FIG. 12B can be modified by rotating the stencil device 60 ninety degrees, then inserting and extracting the device 60 into and from the deformable material 66, resulting in a stonework pattern as depicted in FIG. 12C.

An alternative to using only one stencil device 60, is a second stencil device 60 (not depicted) inserted adjacent to the inserted stencil device 60 to continue the block stonework pattern in the deformable material 66. The stonework pattern can then be extended in any direction by removing either of the two inserted stencil devices 60 and forcibly inserting the removed stencil device 60 in a selected direction, whereby, the aligning procedure is repeated as described above.

Figure 13:
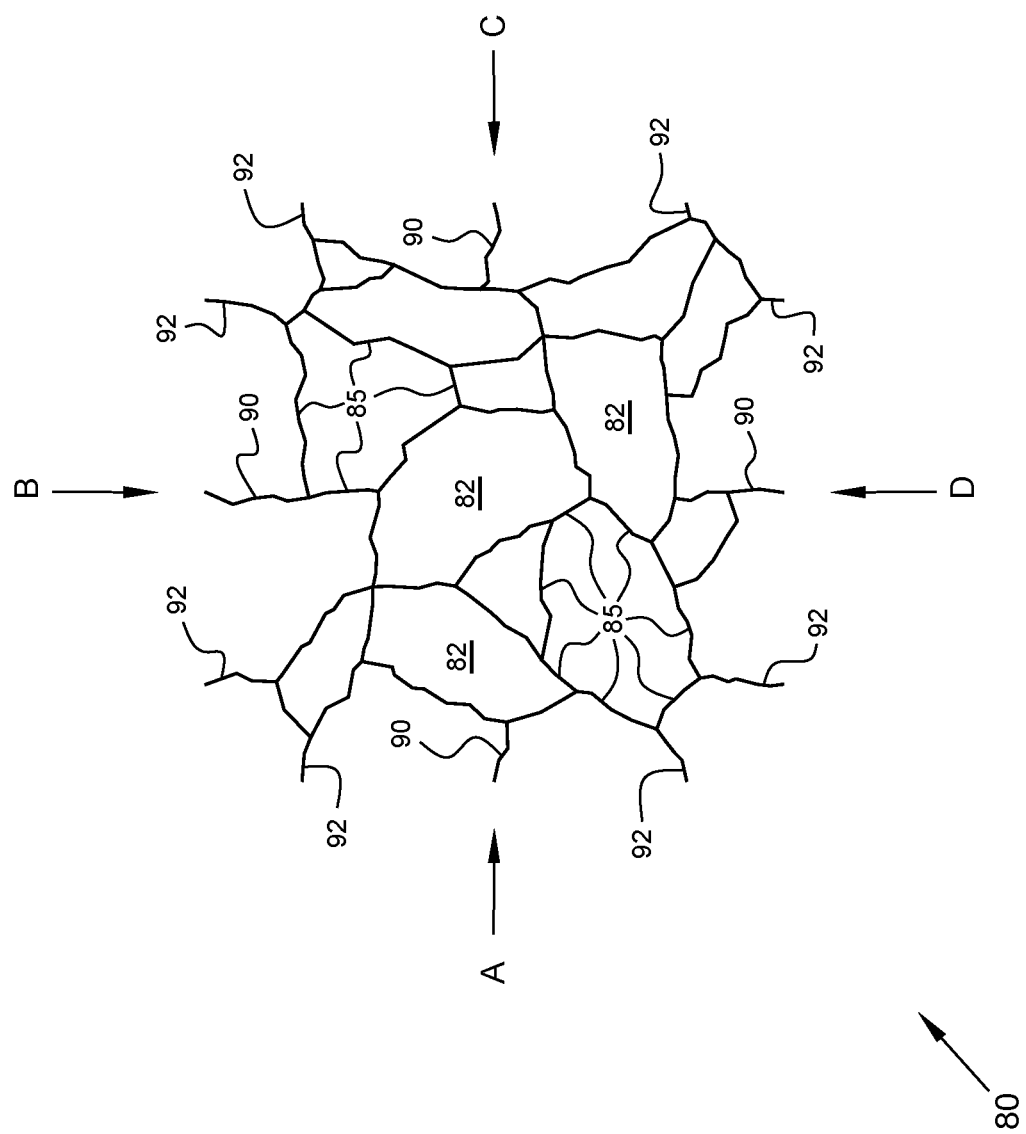
FIG. 13 is a top plan view of a second alternative stencil device for configuring deformable material, the second alternative device having a stonework patter of asymmetrical blocks in accordance with the present invention.
Figure 13A:
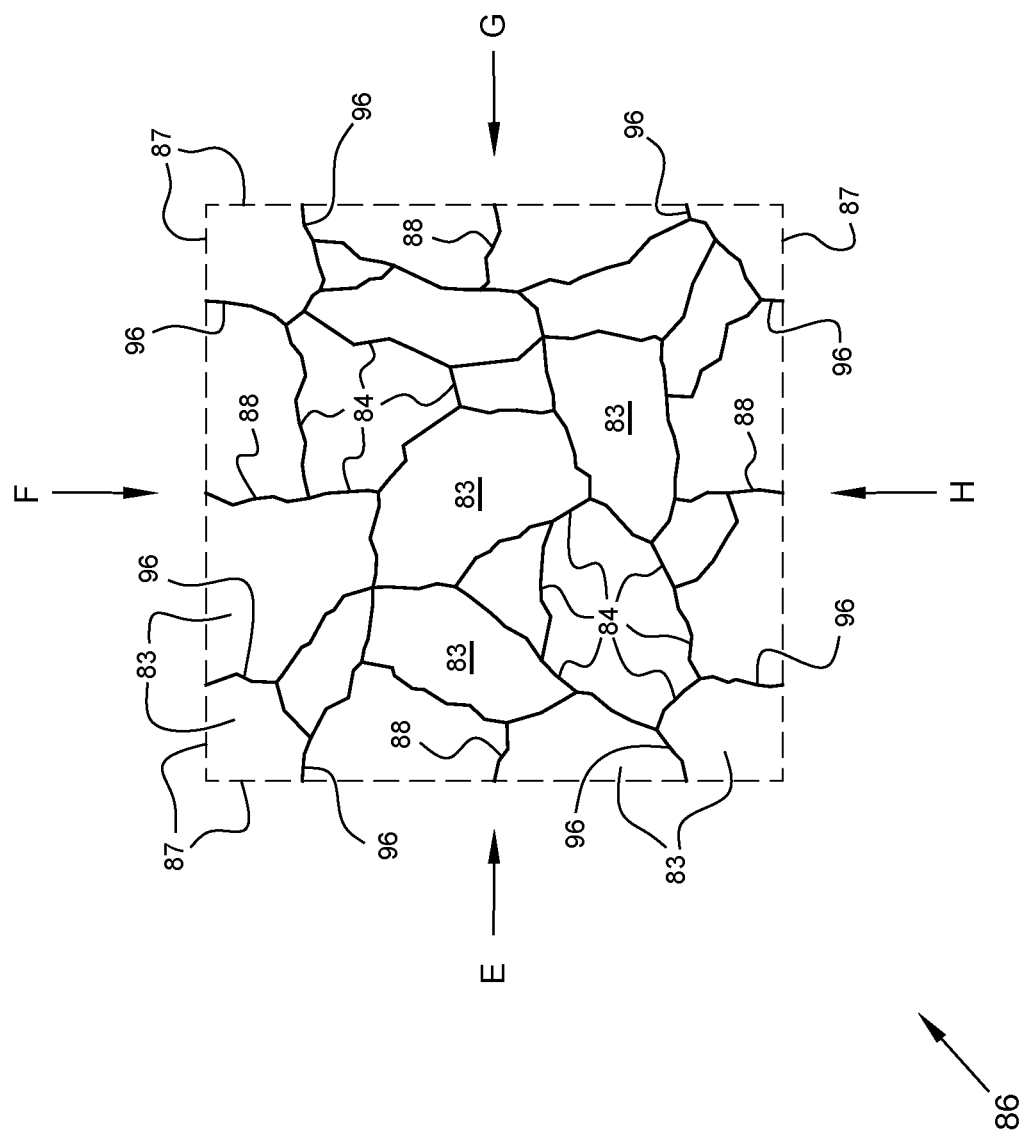
FIG. 13A is a top plan view of the recesses formed in a section of deformable material after the stencil device depicted in FIG. 13 has been extracted from the deformable material in accordance with the present invention.

Referring to FIGS. 13 and 13A, a second alternative stencil device for configuring deformable material that solidifies in accordance with the present invention is depicted and denoted as numeral 80. The stencil device 80 is formed from multiple sections 85 of metal or similar rigid material as the first alternative stencil device 60 and with substantially the same dimensions except that the longitudinal dimensions vary relative to non-linear configurations as depicted in FIG. 13. The stencil device 80 includes a stonework pattern of asymmetrical block 82 configurations formed via corresponding metal sections 85 that configure the same block configurations 83 (FIG. 13A) in a section 86 of deformable material 87 (concrete) via grout line recesses 84. The deformable material 87 will solidify within a predetermined time period sufficient for a user to forcibly urge the second alternative stencil device 80 into the deformable material 87 at multiple surface positions before the material 87 solidifies.

In operation, the first alternative stencil device 80 penetrates the surface of the deformable material 87 after the material 87 has sufficiently solidified; whereupon, the device 80 is extracted from the deformable material 87, thereby forming recesses 84 in the material 87 that ultimately represent grout lines 84 (FIG. 12A) that separate adjacent blocks 83. The recesses 84 ultimately receive a coloring agent such as dye or iron oxide in suspension that is disposed upon the recesses 84 in the deformable material 87, thereby, permanently marking the dividing lines between the adjacent blocks 83 to appear as grout lines 84.

Figure 13B:
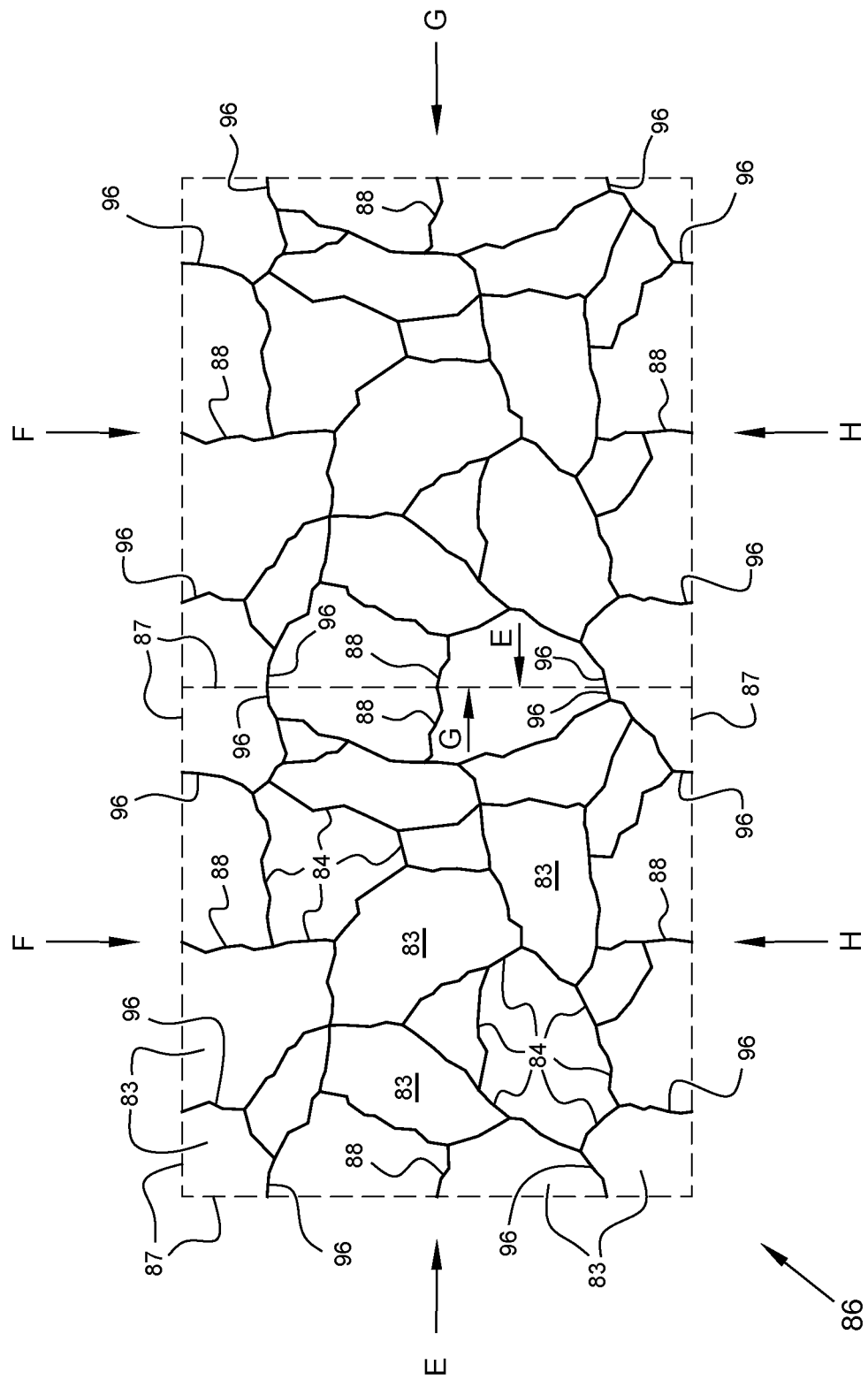
FIG. 13B is a top plan view of two sets of continuous joined recesses formed in two sections of deformable material by the second alternative stencil device depicted in FIG. 13 that formed the set recesses depicted in FIG. 13A.

The extracted stencil device 80 is re-inserted into the deformable material 87 adjacent to the section 86 of deformable material 87; whereby, the stonework pattern is continued by aligning a centerline 90 and two guidelines 92 (each guideline 92 is equally spaced on opposite sides from the centerline 90) of a selected side (A-D) of the second alternative stencil device 80 above respective recesses 88 and 96 previously formed in a selected side (E-H) of the deformable material 87. After completing the alignment, the device 80 is urged into the deformable material 87 a predetermined distance; whereby, the end portions of lines 90 and 92 of a selected side (C) of the device 80 engage end portions of respective aligned recesses 88 and 96 of a selected side (G) of the of the deformable material 87 section 86. After the stencil device 80 is extracted from the deformable material 87, continuous recesses 88 and 96 extend from side (G) of section 86 of the deformable material 87 into side (E) of section 86A of deformable material 87 (see FIG. 13B). The stonework pattern is then repeated via inserting the extracted stencil device 80 into an adjacent surface of deformable material 87 until the stonework pattern covers the entire surface of the deformable material 87 with a coloring agent applied to all the recesses 84, 88 and 96. Although the stonework pattern is depicted in FIGS. 13, 13A and 13B, any configuration for the second alternative stencil device 80 can be used to impress any selected design into the deformable material 87.

An alternative to using only one stencil device 80, is a second stencil device 80 (not depicted) inserted adjacent to the inserted stencil device 80 to continue the block stonework pattern in the deformable material 87. The stonework pattern can then be extended in any direction by removing either of the two inserted stencil devices 80 and forcibly inserting the removed stencil device 80 in a selected direction, whereby, the aligning procedure is repeated as described above.

The first and second stencil devices 60 and 80 can be fabricated from a polymer or metal to allow the devices 60 and 80 to be forcibly inserted into and entirely through the deformable material 66 and 87. After the first and second stencil devices 60 and 80 are removed, recesses 62 and 84 are formed that extend through the deformable material 66 and 87; whereby, water can pass through the deformable material 66 and 87 and into the foundation material, thereby enabling grass or other vegetation that form living patterns to be grown upon the surface of the deformable material 66 and 87.

Alternatively, the devices 60 and 80 can be fabricated from paper or organic porous materials that can remain in the deformable material 66 and 87, and ultimately be used as a base to grow grass or other vegetation that provide ground cover. Alternative materials that can be disposed in the recesses include, but not limited to colored grout, sand, powders and polyurethane foam that solidifies to fill the recesses, thereby providing patterns upon the surface of solidified deformable material with varying colors.

An alternative to using first and second stencil devices 60 and 80 formed from the above non-deformable materials, is to fabricate the devices 60 and 80 from deformable material such as dissolvable paper, rice paper, starch or rubber. The devices 60 and 80 fabricated from paper or rice paper include a lateral dimension of about one-quarter inch and a coloring agent that leaches from the dissolvable paper into the recesses formed by the insertion and the dissolving of the devices 60 and 80 in the formed recesses 62 and 84 in the deformable material 66 and 87, resulting in a stonework pattern or any selected configuration in the deformable material 66 and 87.

Deformable devices 60 and 80 fabricated from rubber or plastic can include a relatively thin foam layer secured to the stencils 60 and 80 on an edge portion that engages a fresh deformable material such as concrete or mortar. The foam layer can include a coloring agent to impart a color upon selected surface portions of the deformable material 66 and 87 without the devices 60 and 80 penetrating the selected surface portion, resulting in a grout pattern upon the selected surface portion that becomes a permanent pattern after the deformable material 66 and 87 solidifies.

The foregoing description is for purpose of illustration only and is not intended to limit the scope of protection accorded this invention. The scope of protection is to be measured by the following claims, which should be interpreted as broadly as the inventive contribution permits.

The invention claimed is:

1. A Stencil Device for Forming Configurations in Deformable Material comprising:
   a first member having ridge portions integrally joined to channel portions, said first member ridge portions including top walls, upper planar side walls and lower portions having bottom insertion edges that promote the insertion of said ridge portions of said first member into deformable material, said channel portions including top walls having recesses, upper planar side walls and lower portions having bottom insertion edges that promote the insertion of said channel portions of said first member into deformable material;
   at least one grasping handle integrally joined to a top wall of said ridge portions to promote insertion and extraction of said ridge portions of said first member into and from the deformable material after the deformable material has sufficiently solidified, said first member handle promoting the removal of said first member from the deformable material after the deformable material has sufficiently solidified;
   a second member having ridge portions integrally joined to protrusion portions, said second member ridge portions including top walls, upper planar side walls and lower portions having bottom insertion edges that promote the insertion of said ridge portions of said second member into deformable material, said protrusion portions ultimately disposed in said recesses in said top walls of said channel portions of said first member, whereby, first end walls of said protrusion portions engage cooperating first end walls of said channel portions, thereby promoting a continuous insertion edge across said first and second members and preventing ridges in recesses formed in the deformable material after said first and second members are removed from the deformable material; and at least one grasping handle integrally joined to a top wall of said second member ridge portions to promote insertion and extraction of said ridge portions of said second member into and from the deformable material after the deformable material has sufficiently solidified, said second member handle promoting the manual removal of said second member from the deformable material after the deformable material has sufficiently solidified;

whereby, said first and second members ultimately form a design pattern across a surface of deformable material by alternating the insertion and removal of said first and second members across the surface of the deformable material.

2. The stencil device of claim 1 wherein said lower portions of said first member ridge portions and said channel portions include a substantially "V" configuration.

3. The stencil device of claim 1 wherein said lower portions of said second member ridge portions include a substantially "V" configuration.

4. The stencil device of claim 1 wherein said first and second end walls of said channel portions are separated a dimension greater than the dimension separating said first and second end walls of said protrusion portions, resulting in congruent engagement between first end walls of said channel and protrusion portions, and a continuous insertion ridge extending across said first and second members.

5. The stencil device of claim 4 wherein said dimensions separating said first and second end walls of said channel portions, and the dimensions separating said first and second end walls of said protrusion portions, result in a gap between the second end walls of said channel portions and the second end walls of said protrusion portions.

6. The stencil device of claim 1 wherein said first member includes a lateral dimension sufficient to penetrate the deformable material from a surface portion to a base material upon which the deformable material has been disposed.

7. The stencil device of claim 6 wherein said first member is fabricated from dissolvable paper with soil and seeds, whereby, said soil and seeds are ultimately disposed upon material under said deformable material after said paper has dissolved and the deformable material has solidified, resulting in vegetation growing in recesses formed by said first member.

8. The stencil device of claim 1 wherein said second member includes a lateral dimension sufficient to penetrate the deformable material from a surface portion to a base material upon which the deformable material has been disposed.

9. The stencil device of claim 8 wherein said second member is fabricated from dissolvable paper with soil and seeds, whereby, said soil and seeds are ultimately disposed upon material under said deformable material after said paper has dissolved and the deformable material has solidified, resulting in vegetation growing in recesses formed by said first member.

10. The stencil device of claim 1 wherein said first member is fabricated from dissolvable paper having a coloring agent, said dissolvable paper being inserted into the deformable material a predetermined distance, said dissolvable paper ultimately dissolving in a relatively firm deformable material, whereby, said coloring agent leaches in said relatively firm deformable material, thereby forming a permanent colored design in said deformable material after said deformable material has solidified.

11. The stencil device of claim 1 wherein said second member is fabricated from dissolvable paper having a coloring agent, said dissolvable paper being inserted into the deformable material a predetermined distance, said dissolvable paper ultimately dissolving in a relatively firm deformable material, whereby, said coloring agent leaches in said relatively firm deformable material, thereby forming a permanent colored design in said deformable material after said deformable material has solidified.

12. The device of claim 1 wherein said first and second members are detachably joined via two channel portions on each side of said first member detachably joined to two cooperating protrusion portions on a selected side of said second member, the distance separating each of said two channel portions on a side of said first member and the distance separating each of said two protrusion portions on a side of said second member are equal distances; whereby, any side of said first member can be detachably joined to any side of said second member via respective detachably joined channel and protrusion portions, thereby allowing a myriad of recess configurations to be formed in the deformable material.

13. The device of claim 1 wherein said first member includes a rolled stencil having a length and width sufficient to cover a preselected surface area of the deformable material.

14. The device of claim 1 wherein said first and second members include rolled stencils each having longitudinal dimensions equal to the longitudinal surface dimension of a selected portion of deformable material, said first and second members being disposed longitudinally parallel and alternating, whereby, said longitudinally alternating first and second members ultimately engage and configure the total surface of the selected portion of deformable material.

15. The device of claim 14 wherein said alternating and longitudinally parallel first and second rolled stencil members include cooperating channel and protrusion portions that detachably secure said longitudinally parallel first and second members together.

16. A Stencil Device for Forming Designs comprising:

a first member having ridge portions integrally joined to channel portions, said first member ridge portions including top walls, upper planar side walls and lower portions having bottom insertion edges that promote the insertion of said ridge portions of said first member into deformable material, said channel portions including top walls having recesses, upper planar side walls and lower portions having bottom insertion edges that promote the insertion of said channel portions of said first member into deformable material;

at least one grasping handle integrally joined to a top wall of said ridge portions to promote insertion and extraction of said ridge portions of said first member into and from the deformable material after the deformable material has sufficiently solidified, said first member handles promoting the removal of said first member from the deformable material after the deformable material has sufficiently solidified;

a second member having ridge portions integrally joined to protrusion portions, said second member ridge portions including top walls, upper planar side walls and lower portions having bottom insertion edges that promote the insertion of said ridge portions of said second member into deformable material, said protrusion portions ultimately disposed in said channel portions of said first member; and at least one grasping handle integrally joined to a top wall of said second member ridge portions to promote insertion of said ridge portions of said second member into deformable material after the deformable material has sufficiently solidified, said second member handles promoting the manual removal of said second member from the deformable material after the deformable material has sufficiently solidified, said first and second members being detachably joined via two channel portions on each side of said first member detachably joined to two cooperating protrusion portions on a selected side of said second member, the distance separating each of said two channel portions on a side of said first member and the distance separating each of said two protrusion portions on a side of said second member being equal distances; whereby, any one side of said first member can be detachably joined to any one side of said second member via respective detachably joined channel and protrusion portions, thereby allowing a myriad of recess configurations to be formed in the deformable material across a preselected surface of deformable material by alternating the insertion and removal of said first and second members across the preselected surface of the deformable material.

17. The stencil device of claim 16 wherein said first member includes a lateral dimension sufficient to penetrate the deformable material from a surface portion to a base material upon which the deformable material has been disposed.

18. The stencil device of claim 16 wherein said second member includes a lateral dimension sufficient to penetrate the deformable material from a surface portion to a base material upon which the deformable material has been disposed.

19. A Stencil Device for Configuring Designs in Deformable Material comprising:

a first rolled member having a longitudinal dimension equal to at least one side dimension of a preselected surface area of deformable material, said first rolled member including ridge portions integrally joined to channel portions, said first rolled member ridge portions including top walls, upper planar side walls and lower portions having bottom insertion edges that promote the insertion of said ridge portions of said first rolled member into deformable material, said channel portions including top walls having recesses, upper planar side walls and lower portions having bottom insertion edges that promote the insertion of said channel portions of said first member into deformable material;

a second rolled member having a longitudinal dimension equal to at least one side dimension of a preselected surface area of deformable material, said second rolled member including ridge portions integrally joined to protrusion portions, said second rolled member ridge portions including top walls, upper planar side walls and lower portions having bottom insertion edges that promote the insertion of said ridge portions of said second rolled member into deformable material, said protrusion portions ultimately disposed in said channel portions of said first rolled member, whereby, end walls of said protrusion portions engage cooperating end walls of said channel portions, thereby preventing ridges from being formed in the formed recesses in the deformable material; and a common distance separating adjacent channel portions on each longitudinal side of said first rolled member being equal to a common distance separating adjacent protrusion portions on each side of said second rolled member, said first and second members being detachably joined via said channel portions detachably receiving cooperating protrusion portions; whereby, a longitudinal side of said first rolled member can be detachably joined to a longitudinal side of said second rolled member, thereby allowing either longitudinal side of said first rolled member to be detachably joined to either longitudinal side of said second rolled member; whereby, multiple recess configurations are formed in the deformable material by varying the insertion and removal of said first and second rolled members in a preselected surface of the deformable material.

20. The device of claim 19 wherein said first rolled member includes channel portions having first and second end walls separated a dimension greater than the dimension separating first and second end walls of said protrusion portions of said second rolled member, resulting in engagement between first end walls of said channel and protrusion portions, and a continuous insertion ridge extending across detachably joined first and second rolled members.

* * * * *